(12) United States Patent
Walpole et al.

(10) Patent No.: US 11,628,514 B2
(45) Date of Patent: Apr. 18, 2023

(54) JOINING METHOD

(71) Applicant: ROLLS-ROYCE plc, London (GB)

(72) Inventors: Andrew R Walpole, Derby (GB); John P E Forsdike, Worcester (GB); Gavin J Baxter, Sheffield (GB); Simon E Bray, Derby (GB); Alistair J E Smith, Nottingham (GB)

(73) Assignee: ROLLS-ROYCE plc, London (GB)

( * ) Notice: Subject to any disclaimer, the term of this patent is extended or adjusted under 35 U.S.C. 154(b) by 327 days.

(21) Appl. No.: 16/899,954

(22) Filed: Jun. 12, 2020

(65) Prior Publication Data
US 2020/0391323 A1    Dec. 17, 2020

(30) Foreign Application Priority Data

Jun. 13, 2019 (GB) ................................ 1908479
Jul. 10, 2019 (GB) ................................ 1909875
Jul. 10, 2019 (GB) ................................ 1909876

(51) Int. Cl.
*B23K 20/12* (2006.01)
*B23K 20/24* (2006.01)
(Continued)

(52) U.S. Cl.
CPC ............ *B23K 20/24* (2013.01); *B23K 20/002* (2013.01); *B23K 20/12* (2013.01); *B23K 20/121* (2013.01); *B23K 20/126* (2013.01); *B23K 20/129* (2013.01); *C21D 7/06* (2013.01); *F01D 5/066* (2013.01); *F02C 3/107* (2013.01);
(Continued)

(58) Field of Classification Search
CPC .... B23K 20/24; B23K 20/002; B23K 20/121; B23K 20/126; B23K 20/129; B23K 2101/001; B23K 2103/10; B23K 2103/14; B23K 33/006; B23K 20/12–1215; C21D 7/06; C21D 2221/02; F01D 5/066;
(Continued)

(56) References Cited

U.S. PATENT DOCUMENTS 2,542,955 A * 2/1951 Young ..................... C21D 7/06
                                                         72/76
3,273,233 A * 9/1966 Oberle .................. B23K 20/12
                                                         228/155
(Continued)

FOREIGN PATENT DOCUMENTS

CN       104772560 A     7/2015
EP       2 168 707 A1    3/2010
(Continued)

OTHER PUBLICATIONS

Aug. 12, 2022 Office Action issued in U.S. Appl. No. 16/900,013.
(Continued)

*Primary Examiner* — Kiley S Stoner
(74) *Attorney, Agent, or Firm* — Oliff PLC (57) ABSTRACT

A method of joining a first component to a second component at respective connection surfaces, comprising, in order, applying a local surface treatment to the connection surface of at least one of the first and second components in order to locally alter the microstructure to a depth of between 60 μm and 10 mm below the connection surface; and joining the first component to the second component using a welding process.

15 Claims, 3 Drawing Sheets

(51) Int. Cl.
    *B23K 20/00*     (2006.01)
    *F01D 5/06*     (2006.01)
    *C21D 7/06*     (2006.01)
    *F02C 3/107*     (2006.01)
    *B23K 101/00*     (2006.01)
    *B23K 103/10*     (2006.01)
    *B23K 103/14*     (2006.01)

(52) U.S. Cl.
    CPC .... *B23K 2101/001* (2018.08); *B23K 2103/10* (2018.08); *B23K 2103/14* (2018.08); *C21D 2221/02* (2013.01)

(58) Field of Classification Search
    CPC .......... F01D 5/34; F02C 3/107; F04D 29/023; F04D 29/322; F05D 2230/239; Y02T 50/60
    USPC .............. 228/2.1–2.3, 112.1–114.5, 203–206
    See application file for complete search history.

(56) References Cited

U.S. PATENT DOCUMENTS

| | | | |
|---|---|---|---|
| 3,597,832 A * | 8/1971 | Calton | B23K 20/129 228/262.44 |
| 10,384,302 B2 | 8/2019 | March | |
| 10,641,159 B2 | 5/2020 | Graham et al. | |
| 2003/0160085 A1 * | 8/2003 | Thach | B23K 20/129 228/114.5 |
| 2006/0013645 A1 | 1/2006 | Ilyushenko et al. | |
| 2006/0034695 A1 * | 2/2006 | Hall | F01D 5/3061 416/213 R |
| 2007/0157447 A1 * | 7/2007 | Prevey | F01D 5/005 29/407.01 |
| 2011/0129347 A1 | 6/2011 | Schneefeld et al. | |
| 2015/0202710 A1 | 7/2015 | Nakatani et al. | |
| 2016/0160863 A1 * | 6/2016 | Roach | B32B 27/281 416/193 A |
| 2016/0160869 A1 * | 6/2016 | Roach | C23C 18/1653 416/189 |
| 2016/0187080 A1 * | 6/2016 | Remsburg | B23K 20/24 228/115 |
| 2016/0273368 A1 * | 9/2016 | Smarsly | B22F 3/18 |
| 2017/0320159 A1 | 11/2017 | Lloyd et al. | |
| 2018/0029157 A1 | 2/2018 | Bray et al. | |
| 2018/0036834 A1 | 2/2018 | Menzinger et al. | |
| 2018/0209280 A1 | 7/2018 | Forsdike et al. | |
| 2018/0209281 A1 * | 7/2018 | Boswell | F01D 5/02 |
| 2018/0223395 A1 * | 8/2018 | Mourer | F01D 5/02 |
| 2018/0298947 A1 * | 10/2018 | Farthing | F16C 17/243 |
| 2018/0371594 A1 * | 12/2018 | Raghavan | B24B 39/003 |
| 2019/0118307 A1 | 4/2019 | Wang et al. | |
| 2020/0023458 A1 | 1/2020 | Fujii et al. | |
| 2020/0023460 A1 * | 1/2020 | Boswell | B23K 20/023 |
| 2020/0309032 A1 * | 10/2020 | Mason | F02C 7/06 |
| 2022/0025493 A1 * | 1/2022 | Neishi | C22C 38/002 |

FOREIGN PATENT DOCUMENTS

| | | |
|---|---|---|
| EP | 2 987 583 A1 | 2/2016 |
| EP | 3 213 856 A1 | 9/2017 |
| EP | 3 292 939 A1 | 3/2018 |
| GB | 1 093 343 A | 11/1967 |
| GB | 1 382 234 A | 1/1975 |
| GB | 1 556 314 A | 11/1979 |
| GB | 2559325 A | 8/2018 |
| JP | S59-118292 A | 7/1984 |
| JP | S61-86086 A | 5/1986 |
| JP | H06-661 A | 1/1994 |
| JP | 2003-247405 A | 9/2003 |
| JP | 2007-296564 A | 11/2007 |
| SU | 1375423 A1 | 2/1988 |
| SU | 1493424 A1 | 7/1989 |
| WO | 2018/062545 A1 | 4/2018 |
| WO | 2018/168687 A1 | 9/2018 |
| WO | 2019/081760 A1 | 5/2019 |

OTHER PUBLICATIONS

Dec. 3, 2020 Search Report issued in European Patent Application No. 20178208.3.
Dec. 4, 2020 Search Report issued in European Patent Application No. 20178211.7.
Oct. 7, 2019 Combined Search and Examination Report issued in Great Britain Patent Application No. 1908479.7.
Oct. 7, 2019 Combined Search and Examination Report issued in Great Britain Patent Application No. 1909876.3.
Oct. 7, 2019 Combined Search and Examination Report issued in Great Britain Patent Application No. 1909875.5.
U.S. Appl. No. 16/900,013, filed Jun. 12, 2020 in the name of Bray et al.
Dec. 19, 2022 Office Action issued in U.S. Appl. No. 16/900,013.

* cited by examiner

JOINING METHOD

FIELD OF THE DISCLOSURE

The present disclosure relates to joining components, for example using welding, including friction welding.

BACKGROUND

Friction welding is a process for welding components together that does not require melting. Heat is generated as a result of friction between the components when one is moved relative to another while they are pressed together, resulting in the components fusing together. The use of friction welding techniques may be particularly useful in aerospace applications, for example in the formation of parts of a gas turbine engine, because it facilitates the joining of components formed from dissimilar material. Traditional welding techniques may not be suitable when two materials have a wide difference in melting point.

However, there can be difficulties in the use of friction welding for some materials that are desirable for use in gas turbine engines because the materials may be resistant to flow at high temperatures and thus require large amounts of energy to soften them sufficiently for friction welding. It may therefore be desirable to provide an improved process for joining two components together.

SUMMARY

According to a first aspect there is provided a method of joining a first component to a second component at respective connection surfaces, comprising in order: applying a local surface treatment to the connection surface of at least one of the first and second components in order to locally alter the microstructure to a depth of between 60 µm and 10 mm below the connection surface; and joining the first component to the second component using a welding process.

According to an aspect, the local surface treatment comprises at least one of a mechanical deformation process, a thermal process, a thermo-mechanical process and a chemical process.

According to an aspect, the local surface treatment comprises at least one thermal process in which a part of the component to which it is applied is contacted by a heated or cooled material to provide heating or cooling by conduction or convection, heated by induction or heated by exposure to radiation, plasma or an electron beam.

According to an aspect, the local surface treatment comprises at least one mechanical process in which a part of the component to which it is applied is subjected to at least one of local peening, ultrasonic peening, burnishing and rubbing against another material.

According to an aspect, the local treatment comprises at least one chemical process in which a part of the component to which it is applied is subjected to an etching, anodising or doping process.

According to an aspect, the welding process used to join the first component to the second component is a friction welding process, optionally a rotary friction welding process, optionally an inertia friction welding process.

According to an aspect, the local surface treatment comprises welding the first component to the second component, followed by separating the first component from the second component.

According to an aspect, the local surface treatment comprises friction welding the first component to the second component.

According to an aspect, the same equipment is used to perform the friction welding process used in the local surface treatment and a friction welding process used to join the first component to the second component.

According to an aspect, the friction welding process used in the local surface treatment and a friction welding process used to join the first component to the second component are both rotary friction welding processes, optionally inertia friction welding processes.

According to an aspect, the maximum speed of the first component relative to the second component during the friction welding process is greater for the friction welding process used in the local surface treatment than for the friction welding process used to join the first component to the second component.

According to an aspect, during the local surface treatment the first component is separated from the second component immediately after completion of the steps required to form the weld between the first and second components.

According to an aspect, during the local surface treatment the first component is separated from the second component after the weld formed between the first and second components has cooled.

According to an aspect, the local surface treatment comprises welding the first component to the sacrificial component, followed by separating the first component from the sacrificial component.

According to an aspect, the local surface treatment process is limited to the connection surface and/or a region immediately surrounding the connection surface.

According to an aspect, the local surface treatment affects at least one of the grain size and the strengthening precipitate size of the material.

According to an aspect, the method may further comprise performing a pre-weld preparation process on at least one connection surface after it has been subjected to the local surface treatment and prior to joining the first component to the second component using the welding process.

According to a second aspect, there is provided a gas turbine engine for an aircraft comprising:
  an engine core comprising a turbine, a compressor, and a core shaft connecting the turbine to the compressor;
  a fan located upstream of the engine core, the fan comprising a plurality of fan blades; and
  a gearbox that receives an input from the core shaft and outputs drive to the fan so as to drive the fan at a lower rotational speed than the core shaft, wherein:
  the gas turbine engine comprises two components that have been joined by the method of any one of the preceding claims.

According to an aspect, the turbine is a first turbine, the compressor is a first compressor, and the core shaft is a first core shaft;
  the engine core further comprises a second turbine, a second compressor, and a second core shaft connecting the second turbine to the second compressor; and
  the second turbine, second compressor, and second core shaft are arranged to rotate at a higher rotational speed than the first core shaft.

As noted elsewhere herein, the present disclosure may relate to a gas turbine engine and, in particular components for use in a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
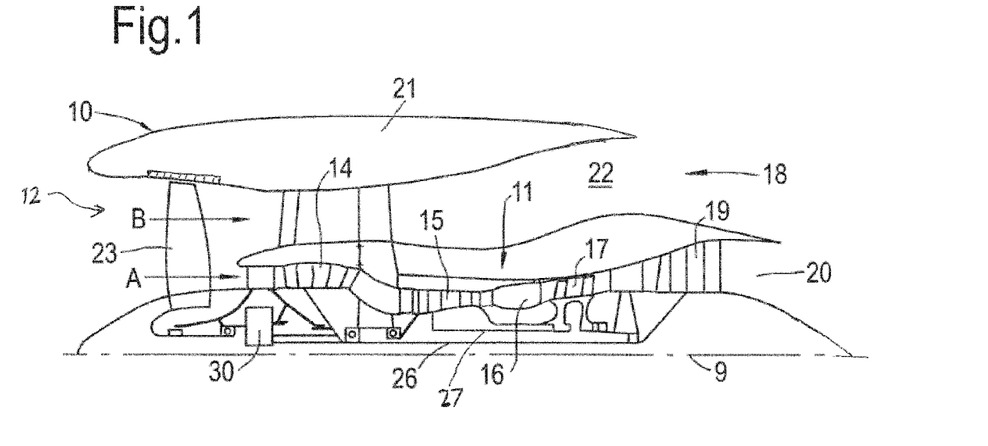
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
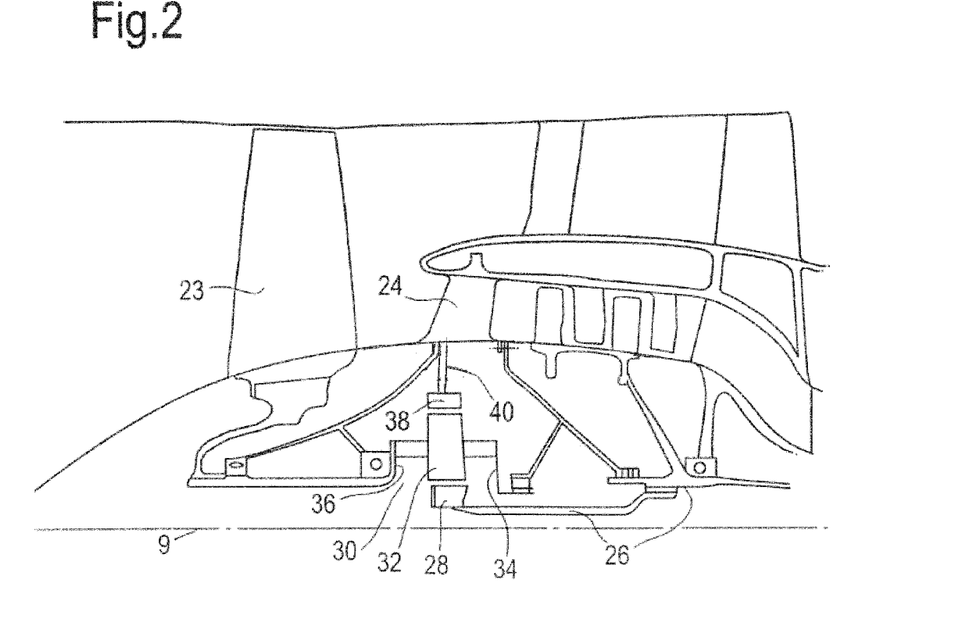
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
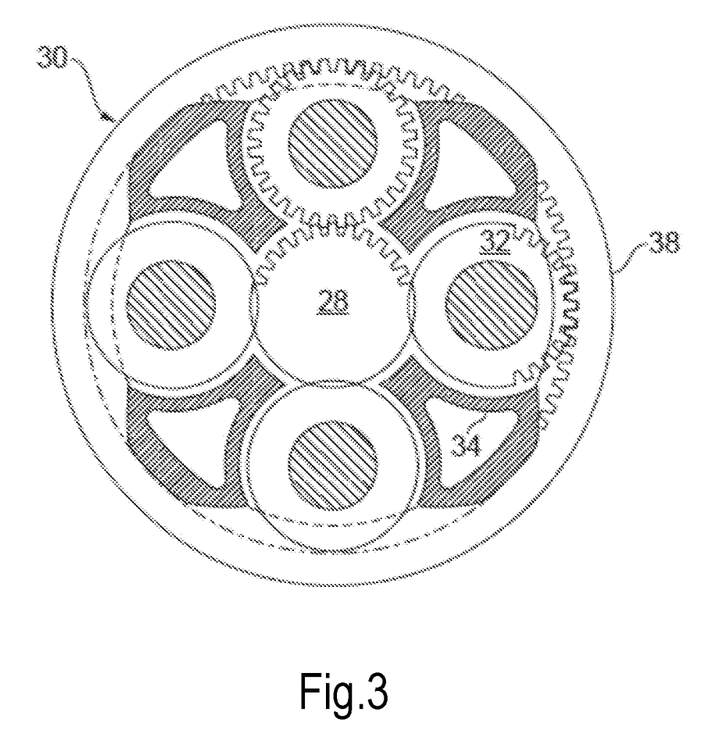
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Two components, for example to be used in a gas turbine engine as discussed above, may be joined together by a welding process. The weld may be formed at respective connection surfaces of the two components, namely the surfaces, or part of a surface, at which the two components are at joined.

Figure 4:
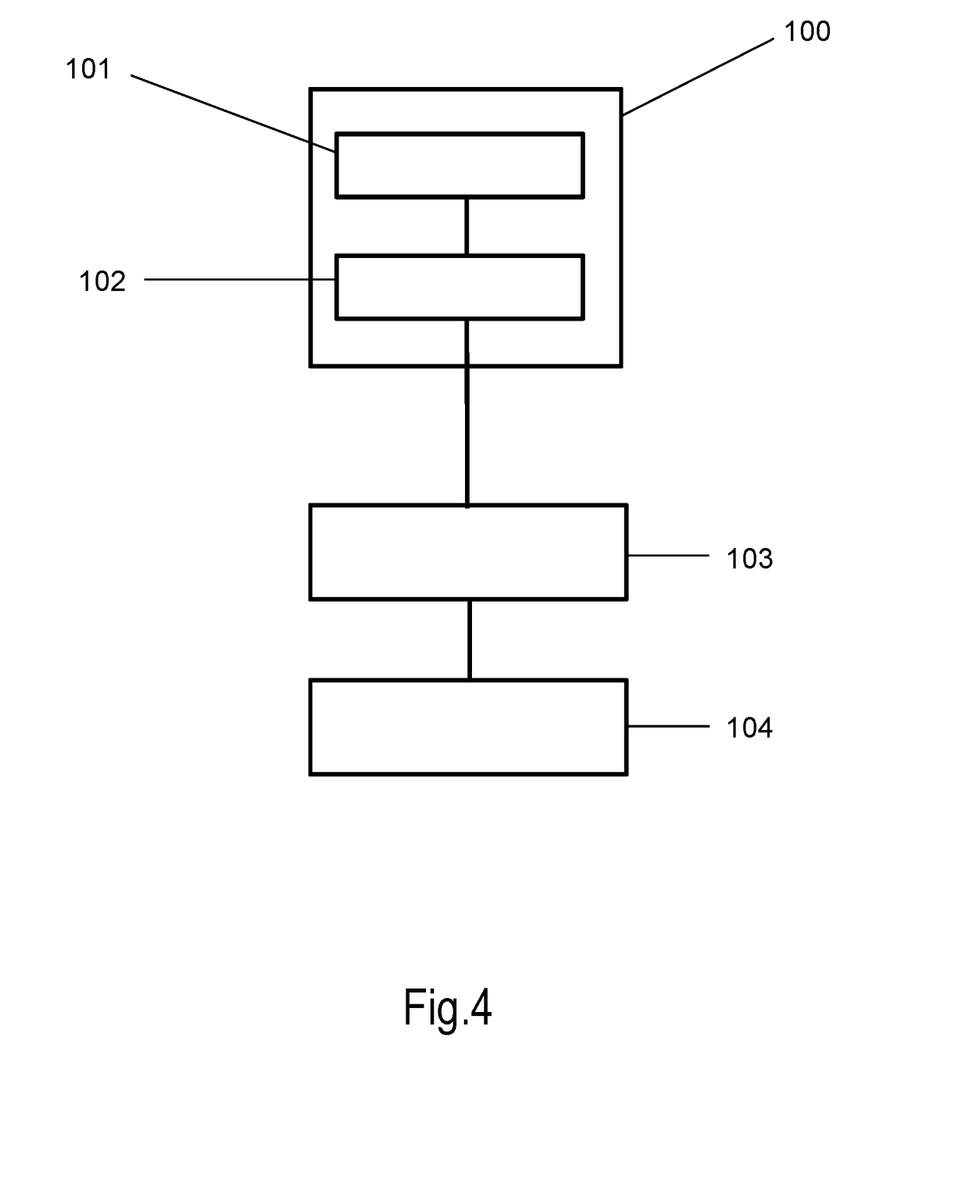
FIG. 4 is a flow diagram schematically representing the steps in a process to join two components together.

FIG. 4 summarises the process steps for joining two components together in an arrangement according to the present disclosure. In the first step 100, a local surface treatment is applied to the connection surface of one or both of the components to be joined together. Subsequently, the components are joined together in a welding step 104.

In an arrangement, the welding step 104 may be a friction welding process. In particular, a rotary friction process may be used, in which one component may be held in a fixed position and the other component may be rotated, typically at high speed, before the components are brought together. The rotation of one component relative to the other component whilst the components are pressed together generates heat by friction, resulting in fusing of the two components. The apparatus for rotating the first component relative to the second component may include a flywheel that stores kinetic energy that is converted to heat energy at the connection surfaces when the components are brought together.

In an arrangement, the welding process 104 may be an inertia friction welding process. In such an arrangement, the drive motor used to rotate the first component relative to the second component is disengaged before the two components are brought together. In such an arrangement, the kinetic energy stored in the rotating flywheel is used to form the weld.

In such arrangements, the speed of rotation of one component relative to the other, and therefore the speed of rotation of the flywheel, may determine the kinetic energy available to be converted into heat energy for forming the weld. However, the energy required in order to form the weld may be determined by the choice of materials of the two components to be joined together. For example, some materials may require greater amounts of energy to soften them sufficiently for friction welding. This may be particularly the case for materials that are resistant to flow at high temperatures, which may, for example, be desirable for materials used to form parts of gas turbine engines. This may include, for example, a nickel based superalloy.

At the same time, for some materials and/or applications, it may also be desirable to limit the maximum speed of one component relative to another component when brought together during a friction welding process. However, by applying a local surface treatment to the connection surface of one or both of the components prior to the welding step, the requirements for the subsequent welding step may be eased. For example, the local surface treatment process may change the microstructure of the material forming the connection surface in a way that facilitates the subsequent welding step. For example, the microstructure of the material may be changed, for example changing the average grain size and/or the strengthening precipitate size. The local change of the microstructure of the material may, for example, reduce the energy required for a friction welding process. This in turn may enable a friction welding step to be performed using a lower speed than would otherwise be required, for example reducing the speed required to a level that provides optimum weld properties.

In an arrangement, the average grain size may be reduced to below about 25 µm, optionally below about 10 µm, optionally between about 5 µm and about 7 µm. In an arrangement, the average strengthening precipitate size may be reduced to local surface less than about 0.3 µm, optionally less than about 0.15 µm.

In an arrangement, the local surface treatment process 100 may be limited to the connection surface and/or a region immediately surrounding the connection surface of one or both of the components to be joined. This may enable the local surface treatment process 100 to be performed more quickly and/or may avoid altering the properties of other regions of the component.

In an arrangement, the local surface treatment process 100 may be configured to locally affect the microstructure of the material to a depth of between 60 µm and 10 mm below the connection surface. Optionally, the depth at which the microstructure of the materially is locally affected may have a lower limit of 0.1, 0.5, or 1 mm and an upper limit of 2, 3, 4, 5 or 8 mm. The local surface treatment process 100 may be configured to locally affect the microstructure of the material to a depth based on the target upset of the welding process used to join the components. For example, it may be configured to locally affect the microstructure of the material to a depth of approximately half the target upset, optionally to a depth of between 25%, 30% or 40% and 60%, 70% or 75% of the target upset.

It should be appreciated that, to the extent that any further preparatory steps are performed on the component prior to the welding step, such as smoothing the surface, consideration of the depth of the region in which the local surface treatment process 100 alters the microstructure should be the affected depth immediately prior to the welding step, namely after completion of such further preparatory steps. This may ensure that the microstructure of the connection surface is altered to a sufficient depth to facilitate the subsequent welding process. It may also ensure that some of the material with the altered microstructure is retained in the final joint rather than being fully extruded as upset flash. It should also be appreciated that, although conventional preparation steps may affect the microstructure of the connection surface at the surface of the component, such processes do not alter the microstructure to a depth sufficient to significantly affect the welding process.

As is shown in FIG. 4, in an arrangement, between the performance of the local surface treatment process 100 and the performance of the welding step 104, one or both of the connection surfaces of the components to be joined together may be subjected to a pre-weld preparation process. Depending on the nature of the local surface treatment process 100 and the welding process 104 to be used, the pre-weld preparation process 103 may not be required. However, it may include removal of any debris from the connection surface of one or both components that remains from the local surface treatment process 100 and/or may involve a step such as a polishing step to prepare the connection surfaces for the welding step 104.

It should be appreciated that a variety of local surface treatment processes 100 may be used. For example, the local surface treatment process 100 may include any combination of mechanical deformation processes, thermal processes, thermo-mechanical processes and chemical processes. Alternatively or additionally, the local surface treatment process 100 may comprise two or more such processes.

In an arrangement, the local surface treatment process 100 may be implemented by a first step 101 in which the components are welded together and a second step 102 in which the components are pulled apart, namely the initially formed weld is broken. It should be appreciated that the step 101 of welding the components together will inevitably result in a local change of the microstructure of the connection surface of the components being joined together and therefore resulting in the local surface treatment. As discussed below, the processing conditions for a welding step 101 used as part of a local surface treatment process 100 may be different from the processing conditions used in a subsequent welding step 104 used to join the components.

Using a process of welding the two components together to perform the local surface treatment step 100 may conveniently limit the effects of the local surface treatment process to the connection surfaces of the components and/or a limited region immediately surrounding the connection surfaces. Furthermore, where it is desirable to perform a local surface treatment process 100 on the connection surface of both components, using a process 101 of welding together the two components to implement the local surface treatment step 100 may be beneficial because the local surface treatment process 100 may be implemented on the connection surfaces of both components simultaneously.

It should be appreciated, however, that if it is desirable to perform the local surface treatment process 100 on the connection surface of only one of the two components to be joined together, the local surface treatment process 100 may involve a step in which that component is first welded to a different component, for example a sacrificial component, that will not form part of the final assembly. Subsequently, these components may be separated, permitting the first component, having been subjected to the local surface treatment process, to be joined to the component to which it is required to be joined.

In an arrangement, the welding step 101 used as part of the local surface treatment process 100 may be a friction welding process, such as an inertia friction welding process. In such an arrangement, the same equipment used to weld together the components in the welding step 101 that is part of the local surface treatment process 100 may be used to weld together the components in the subsequent welding step 104 used to join the components together. Alternatively, different equipment may be used.

It should be appreciated that where rotary friction welding processes, optionally inertia friction welding processes, are used for both the welding step 101 that is part of the local surface treatment process 100 and the welding process 104 used to join the components together, the maximum relative speed of the two components may be different for the two processes. For example, it may be greater for the welding process 101 that is part of the local surface treatment process 100 than for the welding process 104 used to join the components together. In particular, as discussed above, this may enable a relatively high energy level to be used in the welding step 101 that is part of the local surface treatment process, in order to locally change the properties of the materials used to form the components. This may enable the subsequent welding step 104, used to join the components together, to use a relatively slow speed, which may enable improvement of the final weld properties.

In a local surface treatment process 100 in which in a first step 101 two components are welded together and in a second step 102 the components are separated, the timing of the separation step 102 may be chosen to adjust the effect of the heat treatment step 100. For example, the separation step 102 may take place immediately after completion of the steps required to form the weld between the components. In the case of inertia friction welding, for example, the separation step 102 may be implemented as soon as the relative motion between the two components has ceased. In an alternative arrangement, the separation step 102 may be delayed until the weld formed between the first and second components has cooled, for example to below a threshold temperature or until it has cooled to the ambient temperature. In a further alternative, the separation step 102 may take place before the welding process has completed to bond the components together.

Although the above description discloses arrangements in which the welding step 104 used to join the components together is a friction welding process, such as a rotary friction welding process, it should be appreciated that the above arrangement may also be applied to other welding processes including, for example, other friction welding processes such as friction stir welding, and welding processes such as arc welding, laser welding or e-beam welding.

Similarly, although the arrangements discussed above relate to a local surface treatment process 100 based on a friction welding process, such as rotary friction welding, it should be appreciated that any of the above-described welding processes may be used as the welding step 101 within the local surface treatment process 100.

Alternatively or additionally, the local surface treatment process 100 may include a thermal process, configured to provide a desired thermal profile to the connection surface to which it is applied. Such a thermal process may be based on conduction, for example through contact with a heated or cooled material, such as a plate or fluid. Alternatively or additionally, it may be based on convection, for example by exposure to a flow of heated or cooled fluid. Alternatively or additionally, it may be based on an induction process, for example using induction coils to induce a heat profile into the material. Alternatively or additionally, heating may be applied by exposure of the connection surface to radiation, such as generated by heat lamps or a laser, plasma or an electron beam. It should be appreciated that the thermal treatment could be applied directly to the connection surface itself or to surrounding material in order to provide a desirable thermal profile.

Alternatively or additionally, the local surface treatment process 100 may include at least one mechanical process, such as local peening, including shot peening, ultrasonic peening and burnishing. It should be appreciated that such processes may be or include a thermo-mechanical process, namely involving heating of the connection surface as well as mechanical work. In an arrangement, the connection surface and/or a region around the connection surface may be rubbed against a plate of another material, such as a ceramic material, a flow resistant material, or a sacrificial or deformable material, to perform a friction-based thermo-mechanical local surface treatment process.

Alternatively or additionally, the local surface treatment process 100 may include at least one chemical process in which the connection surface and/or a region around it is subjected to an etching, anodising or doping process. An etching process may be used to selectively remove material phases from the surface and near the surface of the component. This may result in a more weldable material in the surface region. An anodising process may be used to locally convert the surface material to an oxide. For example, a surface oxide material may be more resistant to welding than the metallic surface, allowing heat to be transferred with reduced or minimised upset in such a way that the thermal profile is modified to better facilitate successful welding. Such a process may also assist in protecting a softer material to reduce an upset ratio in dissimilar welds. A doping process may be used to locally change the chemistry of the material in and near the surface of the connection surface in order to facilitate welding, for example through addition of elements which will lead to the material being more weldable. The doping may directly change the chemistry to facilitate welding or may indirectly improve weldability, for example if a heat treatment is used after the doping process to further modify the chemistry and/or microstructure in the region of the connection surface through interaction of the doping element with the existing material in such a way that it is changed and made more weldable.

As noted above, the local surface treatment applied to the connection surface may be comprised of one or more processes. It should be appreciated that the local surface treatment applied to the connection surface of a component and the region surrounding the connection surface may not be the same across all of the area to which the local surface treatment is applied. For example, a first process or combination of processes may be used at the connection surface and a second process or combination of processes may be used in a region adjacent the connection surface. Other arrangements are possible in order to achieve a desired effect.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of joining a first component to a second component at respective connection surfaces, comprising in order:

applying a local surface treatment to the connection surface of at least one of the first and second components in order to locally alter the microstructure to a depth of between 60 μm and 10 mm below the connection surface; and joining the first component to the second component using a welding process, wherein both the local surface treatment and the welding process are separate friction welding processes.

2. A method of joining a first component to a second component according to claim 1, wherein the local surface treatment comprises friction welding the first component to a sacrificial component, followed by separating the first component from the sacrificial component.

3. A method of joining a first component to a second component according to claim 1, wherein the local surface treatment process is limited to the connection surface.

4. A method of joining a first component to a second component according to claim 1, where the local surface treatment affects at least one of the grain size and the strengthening precipitate size of the material.

5. A method of joining a first component to a second component according to claim 1, further comprising performing a pre-weld preparation process on at least one of the connection surface of the first and second components after the at least one connection surface has been subjected to the local surface treatment and prior to joining the first component to the second component using the welding process.

6. A method of joining a first component to a second component according to claim 1, wherein the friction welding of the local surface treatment and/or of the welding process is a rotary friction welding process.

7. A method of joining a first component to a second component according to claim 1, wherein the friction welding of the local surface treatment and/or of the welding process is an inertia friction welding process.

8. A method of joining a first component to a second component at respective connection surfaces, comprising in order:

applying a local surface treatment to the connection surface of at least one of the first and second components in order to locally alter the microstructure to a depth of between 60 μm and 10 mm below the connection surface, wherein the local surface treatment comprises welding the first component to the second component, followed by separating the first component from the second component; and subsequently joining the first component to the second component using a welding process.

9. A method of joining a first component to a second component according to claim 8, wherein the local surface treatment comprises friction welding the first component to the second component.

10. A method of joining a first component to a second component according to claim 8, wherein during the local surface treatment, the first component is separated from the second component immediately after completion of the steps required to form the weld between the first and second components.

11. A method of joining a first component to a second component according to claim 8, wherein during the local surface treatment, the first component is separated from the second component after the weld formed between the first and second components has cooled.

12. A method of joining a first component to a second component according to claim 8, wherein the welding process used to join the first component to the second component is a friction welding process.

13. A method of joining a first component to a second component according to claim 12, wherein the same equipment is used to perform the friction welding process used in the local surface treatment and the friction welding process used to join the first component to the second component.

14. A method of joining a first component to a second component according to claim 12, wherein the friction welding process used in the local surface treatment and the friction welding process used to join the first component to the second component are both rotary friction welding processes or are both inertia friction welding processes.

15. A method of joining a first component to a second component according to claim 13, wherein the maximum speed of the first component relative to the second component during the friction welding process is greater for the friction welding process used in the local surface treatment than for the friction welding process used to join the first component to the second component.

* * * * *